UNITED STATES PATENT OFFICE.

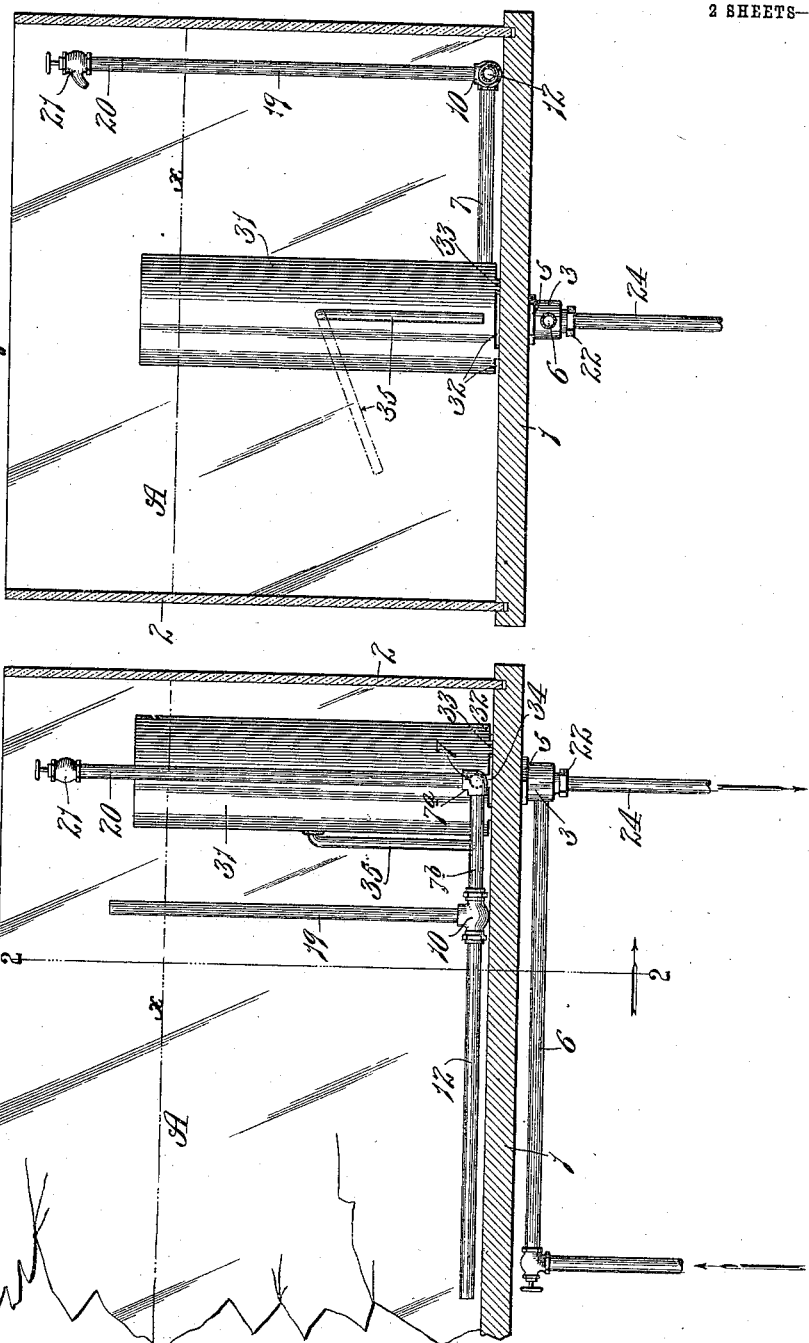

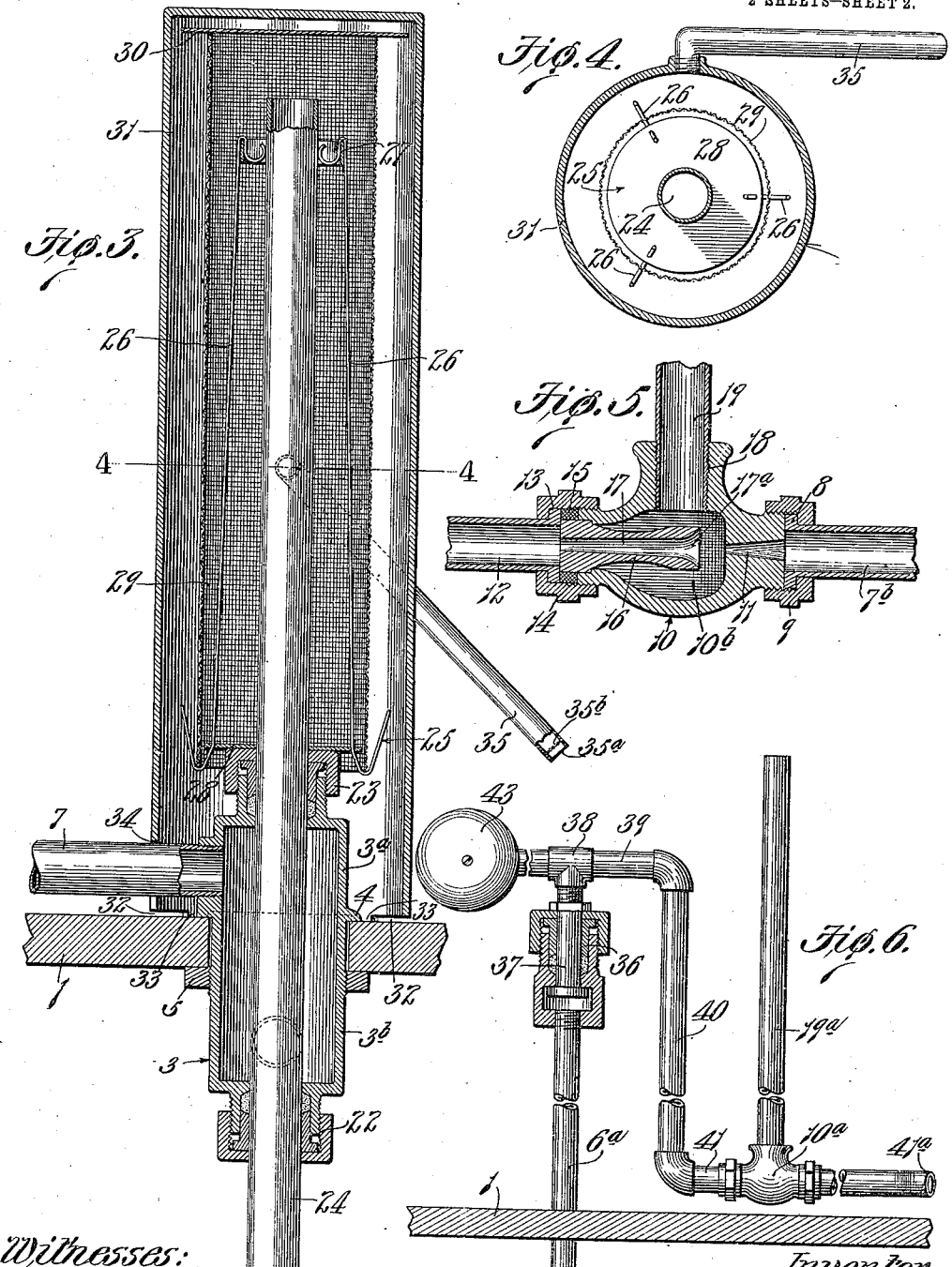

JOHN F. WOHLFAHRT, OF ST. LOUIS, MISSOURI.

AQUARIUM.

976,242.   Specification of Letters Patent.   Patented Nov. 22, 1910.

Application filed December 2, 1909. Serial No. 530,996.

*To all whom it may concern:*

Be it known that I, JOHN F. WOHLFAHRT, a citizen of the United States, residing at St. Louis, State of Missouri, have invented a certain new and useful Improvement in Aquariums, of which the following is a specification, reference being had to the accompanying drawings, forming a part hereof, in which—

Figure 1 is a sectional view of an aquarium equipped with my invention, showing in side elevation my improved means for supplying the tank with water mixed with air and of cleaning the tank by intermittently drawing water off the bottom of the tank; Fig. 2 is a vertical sectional view on line 2—2, Fig. 1; Fig. 3 is an enlarged detail sectional view of my improved means for automatically and intermittently drawing the water from off the bottom of the tank; Fig. 4 is a transverse sectional view on line 4—4, Fig. 3; Fig. 5 is an enlarged detail sectional view of the injector, showing the ends of the air and water supply pipes connected thereto; and Fig. 6 is a detail view, partly in section, illustrating a modified form of arrangement of the water and air supply pipes.

This invention relates to a new and useful improvement in aquariums, the objects of my invention being to provide a construction in which the water tank may be cleaned without removing the fish from the aquarium; in which the water may be automatically and intermittently drawn off from the bottom of the tank, the volume of the water in the tank being reduced to any desired or predetermined depth, the tank being also adapted to be in communication with a continuous stream of fresh water, whereby a circulation of water in and through the tank is maintained and the water kept in a healthy state or condition beneficial to the fish in the aquarium; and in which the water in the tank is aerated; and to improve generally upon constructions of the kind described.

With these objects in view, my invention consists in the novel construction of the several parts thereof and in the novel arrangement and combination of the same, all as will hereinafter be described and afterward pointed out in the claims.

Referring to the drawings, A indicates an aquarium or other tank for containing water, this tank having preferably a marble or other suitable bottom or base 1 and sides 2 preferably of glass or other suitable material, arranged and supported upon said base 1.

3 indicates a hollow cylindrical member supported preferably midway its length in the base 1 of tank A by means of flanges 4, and adapted to be firmly held in position by means of a clamping nut 5, this member 3 having a portion $3^a$ above and a portion $3^b$ below said base 1, see particularly Fig. 3. Threaded preferably into the portion $3^b$ of said member 3 is a pipe 6 leading from some suitable source of fresh water supply; and threaded into the portion $3^a$ of said member 3 and extending preferably along the bottom of tank A is a small section of pipe 7 through which the water supplied to said member 3 through said pipe 6 is adapted to pass. Connected by a joint $7^a$, and preferably extending at right angles, to said pipe 7 is a pipe $7^b$ through which the water from pipe 7 is adapted to pass. The other end of pipe $7^b$ is flanged as at 8, and secured thereto by means of a clamping nut 9 is an injector 10, see particularly Fig. 5. The diameter of the inlet opening 11 in injector 10 is gradually reduced inwardly from pipe $7^b$, so that when the water from pipe $7^b$ enters the hollow interior $10^b$ of injector 10, it is in the form of a fine stream.

12 indicates a discharge pipe, which is flanged at its inner end, as at 13, and secured by a clamping nut 14 to the opposite side of injector 10, a suitable washer 15 being preferably interposed between said flanged end 13 of said pipe 12 and said injector 10. Arranged within said injector 10 is a nozzle portion 16, one end of this nozzle abutting against said flanged end 13 of pipe 12 and the other end extending close to the reduced or discharge end of inlet opening 11, the diameter of bore 17 through this nozzle 16 being gradually reduced outwardly, that is to say, the diameter of said bore 17 at the end of said nozzle 16 adjacent said discharge end or inlet opening 11 is greater than the diameter of said bore at the opposite end of said nozzle 16, the end of said nozzle 16 adjacent said inlet opening 11 being preferably flaring, as at $17^a$, see particularly Fig. 5. Said injector 10 is also provided with a threaded flanged opening 18, in which is threaded an upstanding air supply pipe 19, the upper open end of pipe 19 being above the water line X of the aquarium.

The water under ordinary hydrant pressure enters injector 10 from pipe 7$^b$ and, in entering said injector through said inlet opening 11, as before stated, is reduced to the form of a fine stream, a vacuum being produced in the interior 10$^b$ of injector 10, and the water on entering nozzle 16 draws or sucks therewith the air from pipe 19; and as the water is again reduced, while passing through said nozzle 16, to a narrow stream, the air and water are mixed or intermingled, so that when the water passes into discharge pipe 12 and into tank A, the air will be carried along therewith and the water in the tank A be thus aerated.

A pipe 20 extending above the water line X in tank A, and having a faucet 21 at its upper end, may be connected to pipe 7 at the joint 7$^a$, whereby water may also be delivered into tank A, if desired. Extending preferably through said member 3 and secured therein by stuffing boxes 22 and 23, as shown clearly in Fig. 3, is an upstanding discharge pipe 24. As the water in the tank A discharges through this pipe 24, the water line in the tank A or the height to which it is desired that the water shall go in filling the tank, will depend upon the distance the upper end of pipe 24 is from the base 1 of tank A, the height to which the water shall go in filling the tank A being thus adapted to be regulated by the length of pipe 24 within tank A, the lower end of pipe 24 extending some distance below base 1 of said tank A and into a suitable sewer or other place of discharge, not shown.

25 indicates a bracket comprising wires 26, upper ring 27, and disk or plate 28, which is arranged upon pipe 24 within tank A. The upper ends of wires 26 are bent and supported upon said ring 27, while the lower ends of said wires are bent upwardly to support a tubular gauze or screen member 29 through which the water is adapted to strain when discharging from the tank A into pipe 24. The wires 26 are preferably soldered or otherwise secured to said disk 28, disk 28 being adapted to fit closely around said pipe 24 and to provide a cover or closure for the lower end of said tubular gauze member 29. 30 indicates a disk of somewhat larger diameter than the diameter of said tubular gauze member 29, this disk 30 being arranged upon, and adapted to provide a closure or cap for, the upper end of said gauze member 29.

31 indicates a preferably cylindrical member or casing of any suitable material, which is adapted to rest upon base 1 and to surround said gauze member 29 and said discharge-pipe 24 within tank A, the upper end of this member 31 being closed, while the lower end is preferably open, member 31 being also cut away along its lower edge to provide the water-inlet openings 32 and supporting legs 33. As is obvious, this member 31 is provided with a cut out portion, as at 34, to allow for the passage therethrough of pipe 7.

35 indicates a pipe which is threaded into said member 31 at any desired point, this pipe 35 being adapted to be adjusted or swung as shown in Fig. 2, whereby the depth to which the tank is to be emptied may be regulated.

The water is adapted to be continuously supplied to said tank A from said supply pipe 6 through said member 3 and pipes 7$^a$, 7$^b$, and 12, and injector 10, the water while passing through said injector 10 sucking the air along therewith and into tank A, as hereinbefore described. The pipe 35 is adjusted or swung according to the depth to which it is desired that the tank shall be emptied; should it be desired to empty the tank within a very short distance from the bottom thereof, the pipe 35 is arranged parallel with said member 31, as shown in full lines in Fig. 2, but should it be desired to empty the tank at a greater distance from the bottom or base 1, the pipe 35 is swung upwardly accordingly, as shown by dotted lines in Fig. 2. As the water rises in tank A, the water likewise rises within said member 31, the water in rising also covering and closing the outer end 35$^a$ of pipe 35, thereby cutting off the entrance of air into said member 31. As soon as the water reaches the top of pipe 24 within said member 31, the water will begin to discharge through said pipe 24, on the principle of the siphon, and will continue to discharge through said pipe 24 until the water has been drawn off from tank A or emptied down to below the end 35$^a$ of said pipe 35, at which point air will enter said member 31 through said pipe 35, and the discharge of water will be discontinued. As the water enters said member 31 through the inlet openings 32 at the bottom thereof, it will be seen that the water is drawn off from the bottom of the tank, and thus the water carries therewith all foreign matter which might be in the tank, such foreign matter being caught by the gauze member 29 as the water passes therethrough into said pipe 24, the tank being thus cleaned without necessitating the removal of the fish in the aquarium. The gauze member 29 may be readily removed as is obvious whenever it is desired to clean the same. As the water is continuously entering tank A through said supply pipes hereinbefore mentioned, the water will soon again fill the tank to the level of the top of said pipe 24, when the tank will be again emptied down to the end 35$^a$ of pipe 35, and so on, the water in the tank being in this way automatically and intermittently discharged, whereby a circulation of water in and through the tank is maintained and the water is kept in a healthy state or condition, greatly beneficial to the fish in the aquarium.

In Fig. 6 I have shown a modified form of arrangement of the water and air supply pipes. In small aquariums the arrangement of the air and water supply pipes which I have just described is preferred, but in large tanks it is preferable that the air and fresh water shall be distributed around the tank. For this reason, I lead the water-supply pipe 6ª directly into said tank A and extend the same some distance upwardly therein and arrange on the upper end of said pipe a stuffing-box 36, in which is rotatably mounted a short section of pipe 37. Suitably mounted on the upper end of pipe 37 by a T- or other suitable joint 38, is a pipe 39, and connected to pipe 39 and extending down into the tank A is a pipe 40. Extending horizontally from the lower end of pipe 40 is a discharge pipe 41, in which pipe 41 is arranged an injector 10ª, similar in all respects to injector 10 hereinbefore described, an air supply pipe 19ª extending into said injector 10ª. The discharge end of pipe 41 is preferably bent at a slight angle, as at 41ª, and mounted on the other end of pipe 39 is a counter-balancing weight 43, whereby, as the water is discharged through said pipes, the pipe 37 and its carried parts will be revolved, the air and water being thus distributed around, and over the bottom of, the tank A.

The end 35ª of pipe 35 may, if desired, be covered with a screen or gauze cap 35ᵇ, to prevent the clogging of pipe 35 by the entrance thereinto of fish or other foreign matter.

While I have herein shown and described my invention as particularly applicable to aquariums, it is to be understood that my invention may equally well be applied to other uses, and that changes in the construction, arrangement, and combination of the several parts of my invention may be made and substituted for those herein shown and described without departing from the nature and principle of my invention.

Having thus described my invention, what I claim and desire to secure by Letters Patent is:

1. The combination with a tank adapted to hold water, of a water-supply pipe leading thereinto, a water-discharge pipe leading therefrom, the entrance-end of said discharge-pipe being within, and above the bottom of, said tank and the discharge-end of said discharge-pipe being below the bottom of said tank, a casing surrounding said discharge-pipe within said tank, said casing being provided with a water-inlet-opening below the plane of said entrance-end of said discharge-pipe and with an air-inlet-opening between said water-inlet-opening and the plane of the said entrance-end of said discharge-pipe, and an air-supply-pipe communicating with said air-inlet-opening and swingingly-adjustable relative to said casing; substantially as described.

2. The combination with a tank adapted to hold water, of a water-supply pipe leading thereinto, a water-discharge-pipe leading therefrom, the entrance-end of said discharge-pipe being within, and above the bottom of, said tank and the discharge-end of said discharge-pipe being below the bottom of said tank, a casing surrounding said discharge-pipe within said tank, said casing being provided with a water-inlet opening below the plane of the entrance-end of said discharge pipe and with an air-inlet opening between said water-inlet-opening and the plane of said entrance-end of said discharge-pipe, and a water-straining member within said casing adapted to strain the water entering said entrance-end of said discharge-pipe; substantially as described.

3. The combination with a tank adapted to hold water, of a water-supply pipe leading thereinto, a water-discharge-pipe leading therefrom, the entrance-end of said discharge-pipe being within, and above the bottom of, said tank and the discharge-end of said discharge-pipe being below the bottom of said tank, a casing surrounding said discharge-pipe within said tank, said casing being provided with a water-inlet opening below the plane of the entrance-end of said discharge-pipe and with an air-inlet opening between said water-inlet opening and the plane of said entrance-end of said discharge-pipe, an air-supply pipe communicating with said air-inlet opening and swingingly adjustable relative to said casing, and a water-straining member arranged within said casing and around said discharge-pipe; substantially as described.

In testimony whereof, I have signed my name to this specification in the presence of two subscribing witnesses.

JOHN F. WOHLFAHRT.

Witnesses:
 EDWARD G. KELLEY,
 SHEPARD R. EVANS.